United States Patent [19]

Inoue

[11] 4,325,610
[45] Apr. 20, 1982

[54] SEALING AGENT FOR PLASTIC LIQUID CRYSTAL DISPLAY PANELS

[75] Inventor: Hiroshi Inoue, Ena, Japan

[73] Assignee: Ricoh Watch Co., Ltd., Aichi, Japan

[21] Appl. No.: 214,003

[22] PCT Filed: Jan. 29, 1980

[86] PCT No.: PCT/JP80/00013
§ 371 Date: Sep. 30, 1980
§ 102(e) Date: Sep. 30, 1980

[87] PCT Pub. No.: WO80/01613
PCT Pub. Date: Aug. 7, 1980

[30] Foreign Application Priority Data

Feb. 1, 1979 [JP] Japan ................ 54-10909
Aug. 16, 1979 [JP] Japan ................ 54-104417
Oct. 12, 1979 [JP] Japan ................ 54-131984

[51] Int. Cl.³ .............................. G02F 1/13
[52] U.S. Cl. ................................. 350/343
[58] Field of Search ........... 260/33.4 EP, 31.2 XA, 260/32.4, 32.8 EP, 33.8 EP; 525/423, 424, 438, 440; 350/343

[56] References Cited

U.S. PATENT DOCUMENTS

| | | | |
|---|---|---|---|
| 2,891,034 | 6/1959 | Fisch | 260/45.4 |
| 3,449,280 | 6/1969 | Frigstad | 260/29.2 |
| 3,541,274 | 11/1970 | Wasy D'Cruz | 260/30.4 |
| 3,771,855 | 11/1973 | Burns | 350/160 LC |
| 4,227,779 | 10/1980 | Bissar et al. | 350/357 |

OTHER PUBLICATIONS

IBM Technical Disclosure Bulletin, vol. 15, No. 2, Jul. 1972.

*Primary Examiner*—Joseph L. Schofer
*Assistant Examiner*—Bernard Lipman
*Attorney, Agent, or Firm*—Oblon, Fisher, Spivak, McClelland & Maier

[57] ABSTRACT

A sealing agent for plastic liquid crystal display panels which comprises the following three effective components:

(a) Nylon and/or a linear saturated polyester;
(b) an epoxy resin and/or an isocyanate compound; and
(c) a solvent which can dissolve the components (a) and (b), and a transparent plastic panel substrate.

The sealing agent makes it possible to use a transparent plastic film as a substrate for a liquid crystal display panel, thereby enabling inexpensive mass-production of high quality liquid crystal display panels.

6 Claims, No Drawings

SEALING AGENT FOR PLASTIC LIQUID CRYSTAL DISPLAY PANELS

TECHNICAL FIELD

This invention relates to a sealing agent for plastic panels.

BACKGROUND ART

A liquid crystal display panel has heretofore been manufactured by applying an inorganic or organic sealing agent in the form of a liquid or film to a sealing area on a sheet of glass defining a substrate for the panel, placing another substrate thereon, and heating the whole to solidify the sealing agent. It has, however, been necessary to inject a liquid crystal through a hole in the substrate after solidification of the sealing agent and close the hole, because the sealing agent in the form of a liquid flows into the liquid crystal layer, and the heat applied for solidification of the sealing agent causes degradation or decomposition of the liquid crystal if the liquid crystal is applied beforehand. Therefore, liquid crystal display panels have required a complicated process for their manufacture, and have never been expected to lend themselves to continuous mass-production.

Although it appears possible to employ a transparent plastic film for a substrate for a liquid crystal panel instead of inorganic glass, there has hitherto been no example in which a transparent plastic film is used for the substrate of a field-effect display panel employing a nematic liquid crystal, because such a substrate is required to have a high level of electrical, optical and chemical properties. However, a transparent plastic film having properties which make it suitable for the substrate of a liquid crystal panel has recently become available. This invention is based on the results of the research for the sealing agent which is applicable for the manufacture of a liquid crystal panel using such a transparent plastic film.

It is a principal object of this invention to provide a liquid crystal panel having no hole for liquid crystal injection inexpensively by way of mass production using an organic panel substrate. It is another object of this invention to provide liquid crystal panels having a constantly high quality inexpensively by way of mass production. Other objects of this invention are believed to be easily understood from the following description, and not mentioned herein.

DISCLOSURE OF THE INVENTION

Thus, this invention resides in a sealing agent for plastic liquid crystal panels which comprises the following three effective components (a), (b) and (c):
(a) Nylon, or a linear saturated polyester;
(b) an epoxy resin and/or an isocyanate compound; and
(c) a solvent which is capable of dissolving the abovementioned components (a) and (b), and a transparent plastic substrate for the panel which is formed from a polyester or polyether sulfone.

BEST MODE OF CARRYING OUT THE INVENTION

A plastic film intended for use as a substrate for a liquid crystal display panel is required to have excellent physical and chemical properties, such as heat resistance, chemical resistance, adhesion of a conductive film, electric resistance, visible light transmission, flatness, film strength and optical activity. A transparent plastic sheet having nearly all of those properties has recently been developed, and efforts are still being made for improving it to a further extent. Typical examples thereof include a polyester film, such as polyethylene terephthalate (PET) and polybutylene terephthalate, a polyether sulfone film, or a polycarbonate film, on which a transparent conductive film formed from indium oxide is provided. When such a film is used for preparing a panel substrate, it is usual to subject the film surface to orientation treatment such as by angular deposition of $SiO_2$ in order to improve the effect of a liquid crystal.

When a liquid crystal display panel is prepared from such material, a known adhesive for PET is unsatisfactory because of its low sealing strength, gas barrier properties, heat resistance and solvent resistance. A thermosetting polyester resin in the form of a powder which has recently become known is not acceptable, since its curing temperature is higher than the temperature at which PET is deformed. A silicone sealing agent has to be solidified before a liquid crystal is applied; therefore, it requires a substrate having a liquid crystal injection, and is not suitable for low gas barrier and sealing a panel having no such hole. When a panel substrate is prepared from the abovementioned plastic film such as a PET or polyether sulfone film, there is required a sealing agent:
(1) having high adhesion strength to the plastic film;
(2) which is curable at a temperature lower than that at which the plastic film is thermally deformed (i.e., below about 150° C.);
(3) capable of forming a film by preliminary drying, and sealing by hot pressing at a temperature equal at least to its melting point, but lower than the temperature at which its thermal deformation takes place, without flowing into a liquid crystal layer, or causing any change therein (which is an essential requisite for sealing a panel having no hole for liquid crystal injection); and
(4) which can form a seal having high chemical and solvent resistances.

The current status of the art of sealing involves the use of a hot-melt sealing agent, or a curable sealing agent in the form of a liquid. A hot-melt sealing agent has, however, failed to provide a practically acceptable sealing strength for a plastic panel substrate, since the substrate surface is relatively inert as opposed to a metal or inorganic glass surface.

A lot of time and labor have been required for forming the sealing agent into a film having the shape of a seal, or melting it under heat for application, thereby preventing any reduction in the cost of panel manufacture, though no hole for liquid crystal injection is required in the substrate.

Although a liquid curable sealing agent has provided a fairly satisfactory sealing strength, it has been necessary to employ a substrate having a hole for injection of a liquid crystal or the like after solidification of the sealing agent in order to prevent any sealing agent from flowing into the liquid crystal or the like before solidification, or causing any degradation thereof when heated for curing.

Moreover, no sealing can be achieved between the panels by any known liquid curable sealing agent after its solidification, because it loses its sealing power upon solidification.

The sealing agent of this invention, which incorporates the advantages of both of the known hot-melt and liquid curable sealing agents, and eliminates their disadvantages, overcomes the necessity of making any hole for liquid crystal injection, and provides a sufficiently high sealing strength. More specifically, the sealing agent of this invention comprises thermoplastic linear polymer molecules of the type used in a hot-melt sealing agent, reactive polymer molecules of the type mainly used in a liquid and/or solid curable sealing agent, and capable of crosslinking therewith, and a solvent which can dissolve these two types of polymer molecules, and a panel substrate. The sealing agent containing at least these three components can be applied to a plastic panel substrate, dried for preliminary solidification, and then, heated for penetration into the substrate and completing crosslinking. The sealing agent of this invention having the aforementioned properties has been derived primarily from the results of a lot of experiments, though some theoretical background has been required for its recongnition.

While all of the polyamide resins, such as 6-nylon, 6,6-nylon and 12-nylon, can be used for the component (a), it is preferable to use a resin having a melting point Tm which is higher than 60° C., but lower than 150° C. Examples of the nylon resins having such a melting point range include a copolymer of 6-, 6,6- and 6,10-nylons, a copolymer of 6-nylon, 6,6-nylon, bis-(4-aminocyclohexyl)methane-6 and 11-nylon, and N-alkoxymethylnylon.

If a linear saturated polyester is selected for the component (a), it is possible to use a saturated polyester synthesized from a saturated polycarboxylic acid such as terephthalic acid, isophthalic acid, phthalic acid, 2,6-naphthalenedicarboxylic acid, adipic acid, sebacic acid and trimellitic acid anhydride, a saturated polyhydric alcohol such as ethylene glycol, propylene glycol and neopentyl glycol, and a monomer such as styrene monomer, methyl methacrylate and diallyl phthalate, along with various kinds of catalysts and promotors. A saturated polyester resin (including a saturated copolymer polyester) synthesized mainly from terephthalic acid is particularly superior in heat resistance, impact resistance and flexing resistance. It is preferable to use a saturated polyester having a melting point Tm which is higher than 60° C., but lower than 150° C., and which can be dissolved in an industrial organic solvent. The nylon and the linear saturated polyester may be used either alone, or together.

For the component (b) epoxy resin to be mixed with the component (a), it is desirable to use a liquid one having a relatively low molecular weight of, say, 130 to 1,260, preferably 300 to 400, and which is capable of crosslinking with nylon under heat. An epoxy resin having a higher molecular weight is undesirable, since it is difficult to mix with nylon, and forms a brittle product when cured. The isocyanate compound mentioned as an alternative of the component (b) means a resin composed solely of a compound containing an isocyanate, or a mixture thereof with a substance containing a hydroxyl, amino or carboxyl group, and which is easily reactive with an isocyanate. It is characterized by the high polarity and reactivity of the isocyanate group. Examples of the isocyanate compounds include triphenylmethane triisocyanate (known under the trade name of Desmodur R), tris(4-phenylisocyanate)thiophosphate (known under the trade name of Desmodur RF), a compound known under the trade name of Coronate L or Desmodur L, a TDI dimer (known under the trade name of Desmodur TT), a TDI trimer (known under the trade name of Desmodur IL), 2,4,4'-diphenylether triisocyanate (known under the trade name of Hylen DM), and MDI (known under the trade name of Coronate AP). The epoxy resin and the isocyanate compound may be used either alone or in combination. Further, a curing accelerator, e.g., tetraorthotitanates, chelated titanium compounds etc. may be added.

The solvent (c) which can dissolve the components (a) and (b), and a transparent plastic panel substrate formed from a polyester or polyether sulfone may be appropriately selected from among individual solvents such as haloalcohols, e.g., 1,1,1,3,3,3-hexafluoro-2-propanol (HFIP), methyl acetate, ethyl acetate, trichloroethylene, methylene chloride, methyl ethyl ketone, Cellosolve acetate, dioxane, tetrahydrofuran, chloroform, 2-nitropropane, nitromethane, phenol, m-cresol etc., or mixed solvents such as toluene/ethanol, toluene-/acetone, solvent naphtha/acetone, carbon tetrachloride/acetone, n-butyl acetate/toluene, and DOP/acetone.

The suitable ratio in which the components (a) and (b) are mixed is in the range of (a) 2.5 to 3/(b) 1. With an increased deviation of the mixing ratio from this range, the reactivity of these components is reduced, and the quality of the cured product thereof is lowered. It is desirable that the proportion of the components (a) and (b) relative to the component (c) be less than about 30% by weight of the component (c) which is an upper limit to the quantity of the resinous components which can be completely dissolved in the component (c) solvent, and more preferably, it is in the range of about 10 to 20% by weight in order to provide a sealing agent having a suitable viscosity for application to the substrate. If the components (a) and (b) have a total concentration which is lower than 10%, the low viscosity and easy flowability of the resulting sealing agent makes it difficult to apply the agent to a sealing area appropriately.

When a solution of a mixture of the components (a) and (b) in the component (c) is applied to a polyester or polyether sulfone film, the component (c) dissolves the film surface, too, and causes the resinous components in the sealing agent to penetrate into the molten area in the film.

According to this invention, this phenomenon is utilized for sealing a liquid crystal display panel. The sealing agent is applied to the opposite areas in a pair of panel substrates, and after the solvent is volatilized, the substrates are put together, and heated for fusion, so that crosslinking may take place. When the sealing agent is cured, molecules are united with each other in the boundary areas between the sealing agent and the surfaces of the panel substrates, and produce a very high adhesive power.

In accordance with this invention, an appropriately prepared sealing agent is applied to the opposite sealing areas in upper and lower panels on which a predetermined wiring pattern is provided, and which has been suitably treated with an orientation agent if required. The application of the sealing agent may be performed on an industrial basis by any suitable means such as a transfer or screen printing system employing a relief plate having a convex configuration which is complementary to the sealing areas, while experimentally, a syringe having a needle can be used for extrusion application of a solution of the sealing agent.

The upper and lower panels to which the sealing agent has been applied are, then, dried at 40° C. to 80° C. for 30 to 60 minutes. After the sealing agent has been dried, a liquid crystal is dropped onto one of the panels inwardly of its sealing area, and then, those areas of the upper and lower panels to which the sealing agent has been applied are placed against each other, and pressed together under heat. For such hot pressing, the panels are heated to a temperature of, say, 120° C. to 150° C., and a light pressure which may be as low as is required merely for holding the sealing areas together is applied to the panels. Hot pressing may be completed in two to three seconds. Thus, the upper and lower panels form a completely sealed liquid crystal display panel enclosing a liquid crystal therein. The resulting panel has a sealing strength of 500 to 1,000 g/25 cm. If the sealed portion is further heated at 120° C. to 150° C. for 10 to 30 minutes, its sealing strength is improved to the extent that any attempt to break the seal will result in destruction of the substrate film.

Alternatively, it is possible to provide a seal for such a panel if a solution of the sealing agent is applied only to one of the panel substrates, and after the sealing agent has been dried and solidified, the other substrate is placed thereon, followed by the hot pressing of the whole. While this method advantageously reduces the consumption of the sealing agent, the panel thus obtained shows a lower sealing strength after hot pressing, and even if the sealed portion is heated again after hot pressing. The liquid crystal to be enclosed within the panel may be appropriately selected from among, for example, a nematic liquid crystal such as a biphenyl, phenyl benzoate, azoxy or Schiff's liquid crystal, a cholesteric liquid crystal, and a smectic liquid crystal.

EXAMPLE 1

An upper and a lower panel is prepared by depositing $SiO_2$ angularly for horizontal orientation on a plastic panel comprising a polyester (polyethylene terephthalate) film carrying thereon a transparent conductive film of indium oxide containing a small amount of tin. An epoxynylon solution of the following composition is applied by a syringe to each of the horizontally orientated upper and lower panels in a shape defining a sealing area:

Nylon (having a peak melting point of 123° C.; Daisel Chemical Industry Ltd.'s product known under the trade name "Daiamid T-250")—15 g
Epoxy resin (Shell's Epikote 815)—5 g
HFIP—50 ml and the sealing agent is dried at 65° C. for 30 minutes. After the sealing agent has been dried (solidified), a biphenyl liquid crystal (i.e., a BDH product known under the trade name of E-7) is dropped onto one of the panels inwardly of the sealing area, and after the other panel has been placed in intimate contact therewith so that no bubble may be caught inwardly of the sealing areas of the panels, they are hot pressed together at about 130° C. for two to three seconds, whereby the liquid crystal is confined within the panels. Then, the panels are maintained at 150° C. for ten minutes for curing of the sealed portion, whereby a liquid crystal display panel is formed. It has the following properties:

Sealing strength (peeling test): The film is broken, or peeled off the conductive film;

Chemical resistance (as tested for one hour in an atmosphere containing 30% of HFIP): The panel surface is partially dissolved or whitened, but the sealed portion does not show any change; Water resistance (as tested at room temperature and a humidity of 90% for 24 hours): No change is found in the value of the current through the panel, or the orientation of the liquid crystal.

The aforementioned properties indicate that the liquid crystal display panel is fully satisfactory for practical use.

EXAMPLE 2

A liquid crystal display panel was prepared by repeating the procedures of the preceding example, except that a sealing agent of the following composition was used, and cured at 130° C. for 30 minutes after hot pressing:

Nylon (having a peak melting point of 103° C.; "Daiamid×1874")—15 g
Epoxy resin (Shell's Epikote 815)—5 g
HFIP—50 ml It showed the same properties as the product of the preceding example.

EXAMPLE 3

A liquid crystal display panel was prepared by using a sealing agent of the following composition, and holding the panel substrates between a pair of glass plates for curing at 170° C. for 10 minutes:

Nylon (having a peak melting point of 115° C.; "Daiamid×2302")—15 g
Epoxy resin (Shell's Epikote 815)—5 g
HFIP—50 ml It showed the same properties as had been obtained in the preceding two examples.

The glass plates were used for the purpose of preventing thermal deformation of the panel substrates.

EXAMPLE 4

A liquid crystal display panel was prepared by repeating the procedures of Example 1, except that a sealing agent of the following composition was used for hot pressing at 130° C. and 3 kg/cm$^2$ for two seconds, and final adhesion at 150° C. for ten minutes:

Copolymerized nylon (having a peak melting point of 115° C.; "Daiamid×2302")—15 g
Saturated polyester (Toyo Spinning's product known under the trade name "Vylon 30P")—15 g
Epoxy resin (having an epoxy equivalent of 190±5)—10 g
HFIP—80 ml It showed the same properties as had been obtained in Example 1.

EXAMPLE 5

A liquid crystal display panel was prepared by repeating the procedures of Example 1, except that a sealing agent of the following composition was used for hot pressing at 130° C. and 3 kg/cm$^2$ for two seconds, and that the panel was left to stand at room temperature for three days, instead of being heated for final adhesion:

Copolymerized nylon (having a peak melting point of 107° C.; "Daiamid×1874")—15 g
Saturated polyester (Toyo Spinning's product known under the trade name "Vylon 30P")—15 g Isocyanate compound (known under the trade name "Coronate L")—8 g
HFIP—80 ml It showed the same properties as had been obtained in Example 1.

EXAMPLE 6

The procedures of Example 1 were repeated for preparing a liquid crystal display panel, except that a polyether sulfone was horizontally orientated as described in Example 1, a sealing agent of the following composition was used, and that the procedures of Example 4 were repeated for hot pressing and final adhesion:

Linear saturated polyester (known under the trade name "Vylon 30P")—15 g
Epoxy resin (Shell's Epikote 828)—5 g
Mixture of methylene chloride and tetrahydrofuran—80 ml It showed the same properties as had been obtained in Example 1. Liquid crystal display panels having similar properties were obtained by using a sealing agent prepared by employing dioxane instead of the mixture of methylene chloride and tetrahydrofuran, and drying it at 110° C. for 10 minutes, and a sealing agent prepared by employing instead of the aforementioned mixture a mixture of at least two compounds selected from among HFIP, methylene chloride, tetrahydrofuran and dioxane, and drying it at 100° C. for 30 minutes.

EXAMPLE 7

Linear saturated polyester (known under the trade name "Vylon 30P")—15 g
Triphenylmethane triisocyanate (known under the trade name "Desmodur R")—2 g
Mixture of methylene chloride and tetrahydrofuran—80 ml A liquid crystal display panel was prepared by repeating the procedures of Example 6, except that a sealing agent of the foregoing composition was used. It was similar to the panel obtained in Example 1.

EXAMPLE 8

A liquid crystal display panel was prepared by repeating the procedures of Example 1, except that a sealing agent of the following composition was used:
(a) Nylon (having a peak melting point of 123° C.; "Daiamid T-250")—15 g
(b) Epoxy resin (Shell's product known under the trade name "Epikote 815")—5 g
(b') Isocyanate compound (known under the trade name "Desmodur R")—4 g
(c) HFIP—80 ml The results which were similar to those obtained in Example 1 were obtained.

A similar liquid crystal display panel was obtained by using a polyether sulfone or polycarbonate film instead of the polyethylene terephthalate film. A similar liquid crystal display panel was also obtained by using a mixed methylene chloride/tetrahysrofuran or methylene chloride/chloroform solvent instead of HFIP.

EXAMPLE 9

A liquid crystal panel was prepared by repeating the procedures of the immediately preceding example, except that a sealing agent of the following composition was used, and that after hot pressing, the panel was cured at 150° C. for five minutes, and left to stand at room temperature for three days:

(a) Linear saturated polyester (known under the trade name "Vylon 30P")—15 g
(b) Epoxy resin (known under the trade name "Araldite CY 230")—5 g
(b') Isocyanate compound (known under the trade name "Desmodur R"; Ciba-Geigy)—4 g
(c) HFIP—80 ml It showed the same properties as had been obtained in the preceding example. Similar results were obtained by using methylene chloride/tetrahydrofuran, or methylene chloride/chloroform instead of HFIP.

EXAMPLE 10

A liquid crystal display panel was prepared by using a sealing agent of the following composition, and holding the panels together between a pair of glass plates for curing at 130° C. for 10 minutes:
(a) Nylon (having a peak melting point of 115° C.; "Daiamid×2302")—20 g
(a') Linear saturated polyester (known under the trade name "Vylon 30P")—10 g
(b) Epoxy resin (known under the trade name "Araldite GY 252")—10 g
(b') Isocyanate compound (polyisocyanate sold by Konishi Gisuke Shoten under the trade name "KU662Y")—8 g
(c) HFIP—80 ml It showed the same properties as the panel obtained in the immediately preceding example.

The glass plates were used for preventing thermal deformation of the panel substrates. Similar results were obtained by using methylene chloride/chloroform, or methylene chloride/tetrahydrofuran instead of HFIP.

Comparative Example

A liquid crystal display panel was prepared by using a sealing agent of the following composition in accordance with the procedures of Example 1:

Nylon (having a peak melting point of 123° C.; "Daiamid T-250")—15 g
HFIP—50 ml

Its properties were as follows:
Sealing strength (peeling test): 300 to 600 g/25 cm;
Chemical resistance (as tested for one hour in an atmosphere containing 30% of HFIP): The panel surface and the sealed portion were whitened or dissolved;
Water resistance (as tested at 110° C. and a humidity of 90% for 24 hours): The panel showed an increase of 10% in the amount of current flowing therethrough, and the liquid crystal showed a disorder in its orientation in the vicinity of the sealed portion. The aforementioned properties indicate that the liquid crystal display panel is unsatisfactory for practical use.

INDUSTRIAL APPLICABILITY

The liquid crystal display panels prepared by using the sealing agent of this invention do not only simplify the means for incorporating a liquid crystal therein because they are not formed with any hole for liquid crystal injection, but can always be produced with uniform quality. As a transparent plastic film, such as of PET, can be used for panel substrates, it is possible to make a liquid crystal display panel by using a transparent plastic film in the form of a tape if the sealing agent of this invention is employed. The sealing agent is also applicable for sealing a plastic display panel employing any other material for display than a liquid crystal, or material associated with such display.

I claim:

1. A method of sealing a liquid crystal display panel comprising:

applying sealant to at least one of separated upper and lower transparent plastic panel substrates, drying said sealant to effect preliminary solidification of said sealant, depositing a liquid crystal within one of the panel substrates, hot press sealing the two panel substrates and curing the sealed portion at a temperature above the melting point of the plastic substrates but below the thermal deformation temperature of the substrates.

2. The sealing method of claim 1, wherein the sealant for the plastic liquid crystal display panels comprises the following three components:
 (a) nylon and/or a linear saturated polyester;
 (b) an epoxy resin and/or an isocyanate compound; and
 (c) a solvent which can dissolve the components (a) and (b), and can also dissolve said transparent plastic panel substrates.

3. The sealing method of claim 2, wherein said component (c) comprises 1,1,1,3,3,3-hexafluoro-2-propanol.

4. The sealing method of claim 2, wherein said nylon and linear saturated polyester have a melting point of 60° C. to 150° C.

5. The sealing method of claim 2, wherein said epoxy resin has a molecular weight of 130 to 1,260.

6. The sealing method of claim 2, wherein said components (a) and (b) have the following ratio:
Component (a): component (b)=2.5 to 3:1.

* * * * *